April 26, 1932.  H. C. ROBB, SR  1,855,420
CONTROL MEANS FOR CONCRETE WEIGHING AND MIXING APPARATUS
Filed March 1, 1930
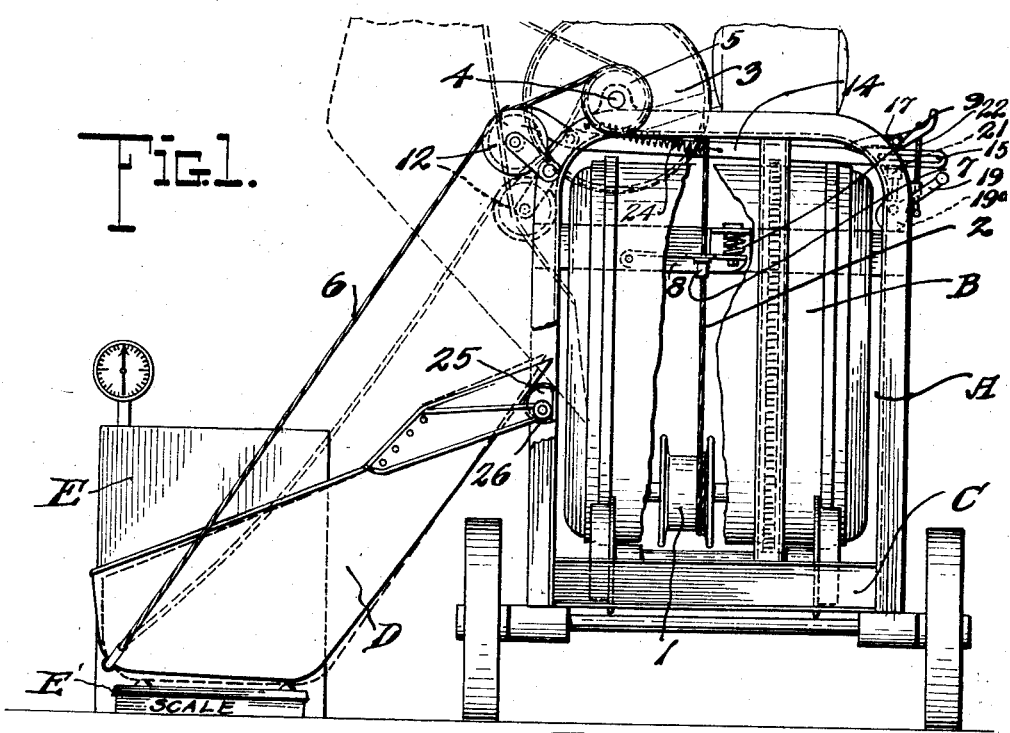
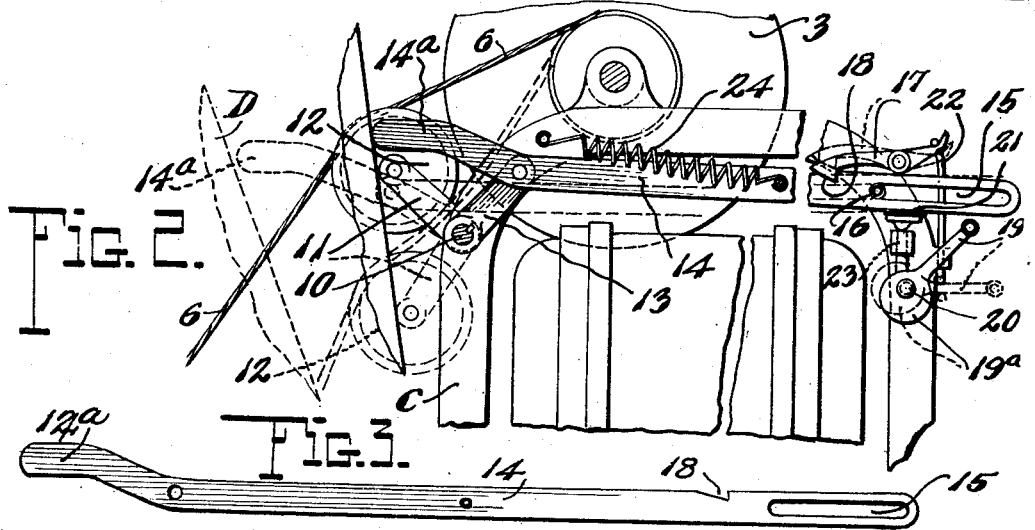
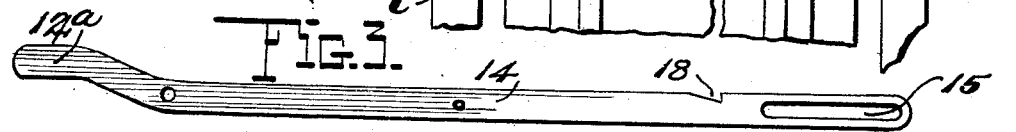
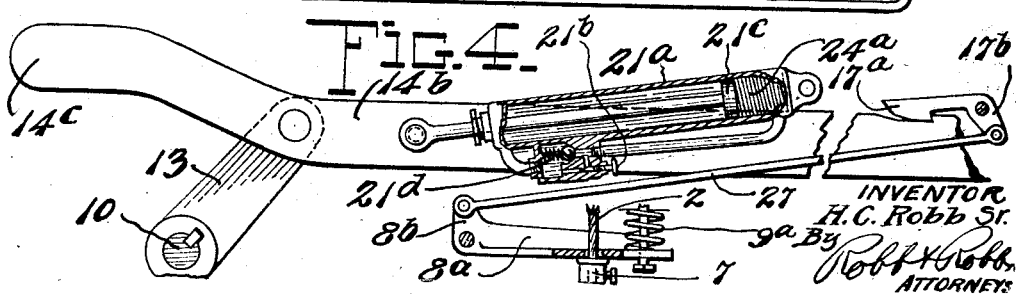

Patented Apr. 26, 1932

1,855,420

UNITED STATES PATENT OFFICE

HARRY C. ROBB, SR., OF WASHINGTON, DISTRICT OF COLUMBIA, ASSIGNOR TO THE T. L. SMITH COMPANY, OF MILWAUKEE, WISCONSIN, A CORPORATION

CONTROL MEANS FOR CONCRETE WEIGHING AND MIXING APPARATUS

Application filed March 1, 1930. Serial No. 432,482.

This invention relates to concrete mixing machines and more particularly to controlling instrumentalities for the charging skip, whereby the same may be lowered a predetermined distance by the usual lowering control means and then subsequently lowered by a supplemental control device.

An object of this invention is to provide skip control instrumentalities carried by the concrete mixing machine for lowering a charging skip to a position just above and spaced from an aggregate weighing scale, and to provide instrumentalities for permitting the skip to be subsequently deposited gently thereon.

Another object of my invention is to provide instrumentalities carried by the mixer for slacking the hoisting or skip cables after they have deposited the skip or charging device on the scale.

A further object is to provide a floating pivot for the skip to permit the skip to equalize itself when deposited on the scale by the supplementary lowering device.

Concrete mixing machines of the type disclosed in the drawings are generally known as construction mixers, and it is becoming the practice with this type of apparatus to weight the aggregates which go into the mix, with the possible exception of the water. This is in some instances weighed, although the general practice is to measure accurately the quantity of water required.

In the adaptation of weighing mechanisms to mixing apparatus, one of the problems encountered is the prevention of injury to these delicate instrumentalities from impacts of the loading receptacle in its deposit upon the load receiving means or platform. While attempts have been made in some instances to take care of this objection, the means to this end usually have been associated with the weighing means, making for complicacy of the latter and inconvenience of manipulation of additional controls or requiring a delicacy of control of the lowering of the charging means which can hardly be expected of operators of such apparatuses.

It is also an object of this invention to provide a mechanism entirely carried by the mixing machine for lowering the skip to a position adjacent the platform of a scale when placed beneath the skip and to provide means whereby the skip may be gently deposited on the scales, thus permitting the use of any standard type of weighing scale without the necessity of the special supporting mechanism now employed.

Other and further objects and advantages of the invention will be hereinafter set forth and the novel features thereof defined by the appended claims.

In the drawings:

Fig. 1 is an end elevation of a conventional type of construction mixer, having my device applied thereto, the full lines denoting the final position of the skip as lowered by the primary lowering means, and the lower dotted lines indicating the final position of the skip, resting on the scales with skip cables slacked, incident to the operation of the supplemental lowering means; the raised dotted line position of the skip indicating charging position and also the cooperation with the supplemental lowering means to cause resetting thereof;

Fig. 2 is an enlarged fragmentary detail view showing the supplemental lowering or control means for the skip;

Fig. 3 is a detail view of the control bar; and

Fig. 4 is an enlarged fragmentary detail view of a modified form of my invention, showing a construction in which primary lowering means functions to control the secondary lowering means, thereby making manual operation and control of the secondary lowering means unnecessary.

Like reference characters refer to like parts in the several figures of the drawings, in which A represents generally a construction mixer which comprises a mixing drum B having the usual support C. Aggregates are introduced into the mixer by the charging skip D. An aggregate weighing scale E is placed beneath the skip D so that in the final lowering movement, the skip will rest on the scale platform E'. The scale E may be of any conventional construction, having the usual scale beams for the gravel, sand and cement elements of the aggregates. Each of these scale beams is provided with a manually shiftable support to render the same inoperative until that particular beam is being used to weigh its respective aggregate. These specific features form no particular part of my invention and are not shown.

A hoist drum 1 is carried by the mixer support C and is adapted to be rotated in one direction by an engine to wind up thereon the hoist cable 2. The hoist cable is unwound from the skip hoist sheave 3 which is keyed to a cross shaft 4 having on the ends thereof the winding sheaves 5, and thereby causes the skip cable 6 to be wound thereon. The hoist cable 2 has located thereon an adjustable stop member 7 which may be positioned to impinge the pivoted stop lever 8 to prevent further unwinding of the hoist cable 7 from the drum 1 and thereby predetermine the lowermost position of the skip D as controlled by this primary lowering means. A spring 9 is interposed between the lever 8 and the support therefor to absorb the impact of the stop 7 during the lowering action of the skip by the drum 1. The secondary lowering or control device, as shown in Fig. 2, comprises a shaft 10 disposed across the receiving end of the framework support C of the mixing machine. This shaft 10 has fixed thereto at opposite ends the levers 11 which carry the sheaves or pulleys 12. These pulleys are disposed in alignment with the skip cables 6 and, during the initial lowering movement of the skip, receive the cables 6 and carry a portion of the weight of the skip.

Secured to the shaft 10 intermediate the frame members of the support C is a lever 13. This lever has pivoted to the free end thereof the control bar 14. The control bar 14 has its slotted extremity 15 carried by a pin or roller member 16 located on the superstructure or framework of the support C. A latch member 17 is disposed on the framework of the mixing machine and is adapted to cooperate with a notch 18 in the control bar 14. Positioned below the control bar 14, as shown in Fig. 2, is the manual control lever 19 which is pivoted at 20 to the framework of the mixer. The control lever 19 is adapted to release the control bar 14 and simultaneously actuate the brake member 21.

The release of the control bar 14 is accomplished through the actuating member 22 which is connected to the tail of the latch 17 and is adapted to be actuated by the lever 19 when the same is moved. Application of the brake 21 is accomplished by the upward movement of the stem 23 incident to rotation of the cam portion 19a of the lever 19 when the same is actuated to lift the latch 17. A tension spring 24 is disposed between the control bar 14 and the framework C to project the bar 14 to the left when released by the brake 21. The control bar 14 has an extension 14a disposed beyond the point where it is pivoted to the lever 13, and this extension is adapted to lie in the path of the skip D when the control bar 14 is in its projected position.

The final upward movement of the skip D impinges the extension 14a of the control bar 14, causing the same to be moved inwardly or retracted to a position where the latch member 17 will again engage the notch 18, as shown in full lines in Fig. 3.

Describing briefly the operation of my invention, it is probably desirable to start with the position of the skip as shown in the lower dotted lines of Fig. 1, namely, with the skip resting on the platform E' of the scale E. Materials are introduced into the skip and weighed, after which the skip hoist clutch, not shown, is engaged, causing rotation of the winding drum 1, which action raises the skip from the lower dotted line position to the upper dotted line position.

Referring now to Fig. 2, it will be noted that the control bar 14, due to the impingement of the skip thereon, is shifted from the dotted line position to the full line position in the final skip movement. This shifting action causes the sheaves or pulleys 12 to be moved from the dotted line position in this figure to the full line or operative position. The operator of the mixer now releases the skip hoist clutch, not shown, which permits the skip to rotate the winding drum 1 in the opposite direction until the stop member 7 disposed on the cable 2 strikes the pivoted lever 8, whereupon further downward movement of the skip under the control of the skip hoist clutch brake is prevented. This brings the parts to the position shown in full lines in Fig. 1, the skip being supported in a predetermined elevated position just above the scale platform E'. The operator now moves the lever 19 of the secondary skip control mechanism from the full line position to the dotted line position shown in Fig. 2. As the lever is moved from the full line to the dotted line position, the connection 22 actuates the latch 17 to release the control bar 14, whereupon the spring 24 becomes operative to move the control bar to the projected position. However, simultaneously with the release of the latch 17 the cam portion 19a of the lever 19 moves the brake member 21 into engagement with the control bar 14 to govern the outward movement thereof. By adjusting the position of the cam 19a, the movement of the control bar 14 may be retarded as desired to permit the arms 13 and 11 to be gently shifted from the full line position shown in Figs. 1 and 2 to the dotted line position. The shifting of these arms, of course, moves the pulleys 12 to lower the skip gently onto the scale E and thereafter slack the cables 7. It should be noted that enlarged sockets 25 for the skip pivot 26 permit a free floating action of the skip pivot after the skip is deposited on the scale E.

Referring to Fig. 4, it should be noted that in place of the brake member 21 a dash pot 21a is used which may be regulated by the needle valve 21b to control the outward movement of the piston 21c. Disposed behind the piston is the compression spring 24a which functions somewhat similarly to the spring 24 in the preferred embodiment. The relief ball check 21d permits rapid return of the control bar 14b incident to the impingement of the skip against the end 14c thereof. In this modified embodiment, the pivoted lever 8a is provided with an arm 8b to which is connected the link member 27. The latch member 17a is also provided with an arm 17b dependent therefrom to which the other end of the link 27 is connected. A cushion or buffer spring 9a is provided for the same purpose as described in the operation of the preferred embodiment. It should be noted that as the skip is lowered, the stop member 7 will impinge the lever 8a, rocking the same upwardly, which causes the arm 8b thereof to actuate the link 27, which will in turn move the arm 17b of the lever 17a to release the control bar 14b.

Upon release of the control bar, the dash pot member 21a permits the spring 24a to gradually and gently move the control bar outwardly, swinging the arm 13 and rotating the shaft 10 to which the arms 11, carrying the pulleys or sheaves 12, are attached. This action automatically actuates the supplemental control device to deposit the skip gently on the scale and subsequently slack the cables to prevent the tension thereof from affecting the calculation in the weighing of the aggregates. The restoration of the supplemental lowering device in my modified embodiment is identical with that described in the preferred embodiment.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In a device of the class described, a mixer support, a charging device, primary control means for moving the charging device to loading and charging positions, and a supplemental control device on the mixer support intermediate the primary control device and the charging device for effecting a subsequent lowering action of the charging device.

2. In a device of the class described, a charging skip, means to raise the skip to cause charging action and to lower the skip and automatically stop the same while lowering at a predetermined elevated position, and supplemental means independent of the first mentioned means for causing further lowering action of the skip.

3. In a device of the class described, charging means for charging a mixing machine with aggregates to be mixed, cable means for effecting charging action and lowering action of the charging means, means to automatically stop the charging means at a predetermined lowered position and means on the machine for causing slacking of the cable means.

4. In a device of the class described, a support, a cable operated charging skip loosely pivoted to said support, means carried by the support for causing charging action of the skip to introduce aggregates into a mixing machine, means to return the skip to a predetermined position, and separate means on the support under brake control adapted to control further movement of the charging means.

5. In a device of the class described, a support, a charging device for introducing aggregates into a mixing machine when moved into one position and adapted when moved into another position to rest upon a weighing scale, primary means carried by the support for lowering and supporting the charging device in a predetermined position above the scale, and supplemental means for lowering the charging device onto the scale, said supplemental means being carried by the support and initiated into operation by the primary lowering means.

6. In a device of the class described, a support, a charging skip loosely pivoted to said support and adapted to assume loading and charging positions, cable means for raising and lowering said charging means to its respective positions, and cable slacking means carried by the support for slacking the cable means after the skip has been lowered to loading position.

7. In a device of the class described, a support, a skip freely pivoted to said support, cable means for raising the skip to charge a mixing machine and to lower the same, stop means carried by the cable means and engageable with the support to render the lowering means inactive to further lower the skip when the skip has been lowered to a predetermined position, and a supplemental lowering means carried by the support for lowering the skip below the predetermined position, said means constituting cable slacking means for the skip cable lowering means.

8. In a device of the class described, a support, a skip freely pivoted to said support, cable means for raising the skip to charge a mixing machine and lower the skip, stop means carried by the cable means and engageable with the support to render the lowering means inactive to further lower the skip when the skip has been lowered to a predetermined position, a supplemental lowering means carried by the support for lowering the skip below the predetermined position, said means constituting cable slacking means for the skip cable lowering means, and means operable incident to raising of the skip to drum charging position to restore the supplemental lowering means.

9. In a device of the class described, a support, a skip for charging a mixing machine, means for raising the skip to charging position and lowering the same, stop means for engaging the lowering means to position the skip in a predetermined raised position, and a supplemental lowering device adapted to be actuated by the stop means to lower the skip below said predetermined position.

10. In a device of the class described, a support, a charging device loosely pivoted to said support, cable means for raising and lowering said charging device, and means movable into the path of said cable means incident to charging the device to predetermine the degree of lowering action thereof, said means being movable out of the path of the cable means incident to the lowering action of the skip.

11. In a device of the class described, a support, a charging skip loosely pivoted to said support, cable means for raising and lowering said charging device, means movable into the path of said cable means incident to charging action of the skip to predetermine the degree of lowering action thereof, said means being movable out of the path of the cable means incident to the lowering action of the skip, and means for controlling the movement of the last named means to retard the movement thereof.

12. In a device of the class described adapted to be associated with a weighing mechanism, charging means for charging a mixing apparatus, and control means therefor including means for disposing the charging means first in proximity to the weighing mechanism and then depositing said charging means upon said weighing mechanism.

13. In a device of the class described adapted to be associated with a weighing mechanism, a support, charging means operable intermediate a mixer and weighing means, cable means for controlling movement of the said charging means from charging to weighing position, and the means on the support operable upon the cable means to produce slacking thereof to effect deposit of the charging means upon the weighing mechanism.

14. In a device of the class described adapted to be associated with a weighing mechanism, a charging device for charging a mixing apparatus in which the materials to be mixed are adapted to be weighed by the weighing mechanism, cable means for sustaining the charging device in inoperative relation to the weighing mechanism, and movable means coacting with the cable means and shiftable to effect slacking of said cable means whereby to deposit the charging device upon the weighing mechanism incident to the slacking of the cable.

15. In a device of the class described adapted to be associated with a weighing mechanism, the combination of a charging device for charging a mixing apparatus, cable means for shifting the charging device to and from weighing position with respect to the weighing mechanism, and control means cooperating with said cable means to normally prevent cooperation between the charging device and the weighing mechanism and shiftable to effect coaction of the charging device with the weighing mechanism, said control means being normalized by the charging device incident to movement of said charging device to charging position.

16. In a device of the class described adapted to be associated with a weighing mechanism, a support, a charging device carried by said support, cable means for operating said charging device, sheaves on the support over which said cable means passes, and means for shifting the sheaves to produce slack in the cable means in one position of the charging device.

17. In a device of the class described adapted to be associated with a weighing mechanism, a support, a charging device carried by said support, cable means for operating said charging device, sheaves on the support over which said cable means passes, and means for shifting the sheaves to produce slack in the cable means in one position of the charging device, said sheaves being arranged in position to be shifted to normal position by said charging device in the movement of the latter.

In testimony whereof I affix my signature.

HARRY C. ROBB, Sr.